(No Model.)  W. W. GILES.  3 Sheets—Sheet 1.
Velocipede.

No. 236,573.  Patented Jan. 11, 1881.

WITNESSES:  INVENTOR:

(No Model.)  W. W. GILES. 3 Sheets—Sheet 2.
Velocipede.

No. 236,573. Patented Jan. 11, 1881.

WITNESSES:

INVENTOR:
W. W. Giles
BY
ATTORNEYS.

(No Model.)
3 Sheets—Sheet 3.
W. W. GILES.
Velocipede.
No. 236,573.
Patented Jan. 11, 1881.
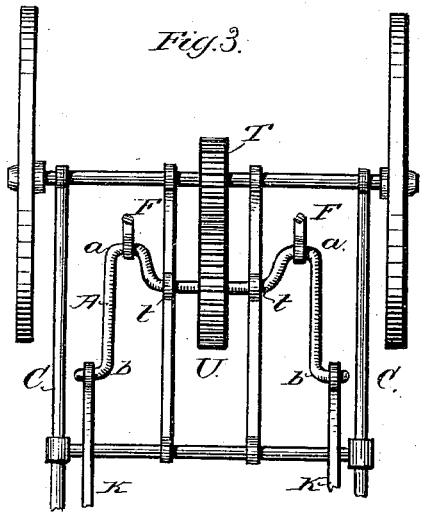
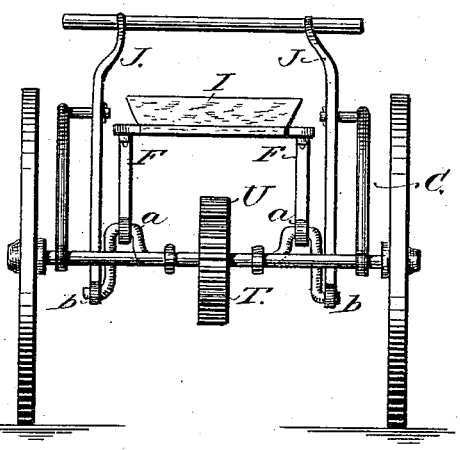
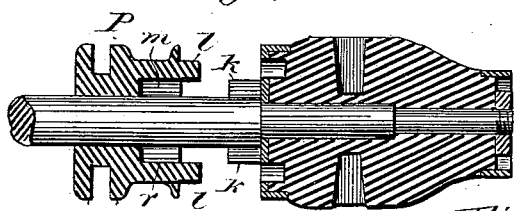
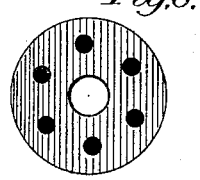
WITNESSES:
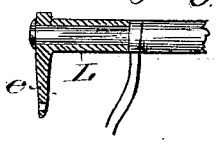
INVENTOR:
W. W. Giles
BY
ATTORNEYS.

UNITED STATES PATENT OFFICE.

WILLIAM W. GILES, OF CHICAGO, ILLINOIS.

VELOCIPEDE.

SPECIFICATION forming part of Letters Patent No. 236,573, dated January 11, 1881.

Application filed September 11, 1880. (No model.)

*To all whom it may concern:*

Be it known that I, WM. W. GILES, of Chicago, in the county of Cook and State of Illinois, have invented a new and Improved Velocipede; and I do hereby declare that the following is a full, clear, and exact description of the same, reference being had to the accompanying drawings, forming part of this specification, in which—

Figure 1:
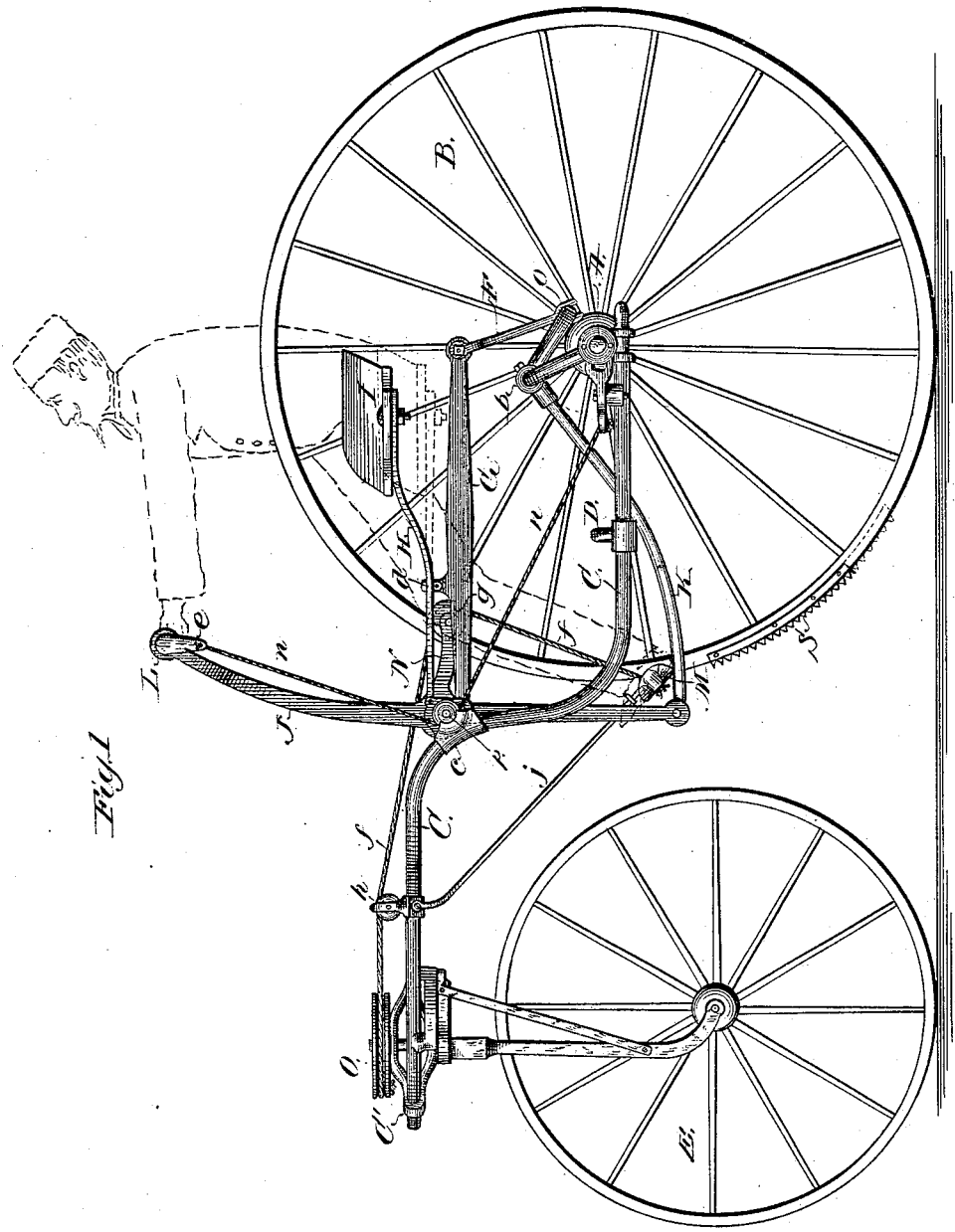
Figure 2:
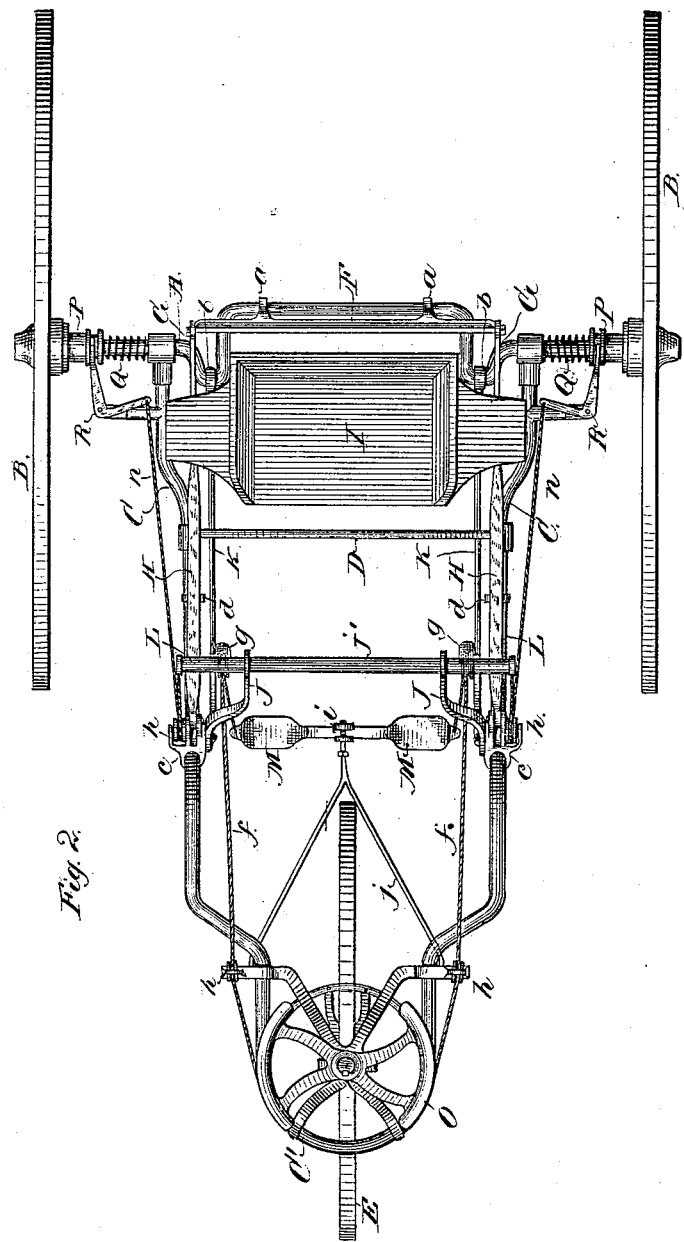

Figure 1 is a side elevation. Fig. 2 is a plan view. Fig. 3 is a partial plan view of a modification with the seat removed. Fig. 4 is a rear view of the same modification. Figs. 5 and 6 are details of the clutch mechanism. Fig. 7 is a detail of the swiveling hand-hold.

My invention relates to an improvement in velocipedes of that class which embody three or four wheels and are operated by the united action of the hands, feet, and seat.

It consists of various features of improvement on this general form of velocipede, all contributing to its excellence as a road-vehicle, as will be hereinafter fully described, and pointed out in the claims.

In the drawings, A represents the main axle, upon which are placed the running wheels B B, which may revolve loosely upon the ends of said axle, but when power is applied to drive the machine are geared to the axle rigidly by means of clutches, hereinafter described. This axle is cranked to permit the application of power, and is connected by bearings to the rear ends of the bent tubular frame-bars C, which, in front of the crank-axle, are connected by a cross-bar, D, and are then bent up, then forward, then in toward each other, and then around a half-circle, which latter is provided with a suitable spider-frame to form a fifth-wheel, C', and give a long bearing to the spindle of the front guide-wheel, E.

The main axle A is bent or cranked to form two eccentric points, one of which, $a\ a$, is acted upon by the pressure of the person on the seat, and the other of which, $b\ b$, is acted upon by the power of the hands and feet. For connecting the seat to the points $a\ a$ a vertical frame, F, is mounted with suitable bearings upon the portion $a\ a$ of the crank-axle, and at the top is jointed to the rear ends of two horizontal bars, G, pivoted or jointed at their front ends to castings $c$, fixed to the side bars, C, of the frame on each side, near the upper portion of the middle bend. To this same casting $c$ is also jointed the forward ends of a pair of springs, H, which have a bearing upon friction-rollers $d$ contained in an elevation on the bars G, and which springs, at their rear ends, carry the seat I, so that the weight of the person is transmitted with an elastic pressure to the bars G, and through them to the frame H and the portion $a$ of the crank-axle.

For transmitting the power of the hands and feet to the crank-shaft a lever, J, is fulcrumed to the casting $c$, and its lower end connected by one or more pitmen, K, with the cranked portion $b\ b$ of the main axle. When the machine is designed for a single seat or one rider, this lever J, I may make in the form of a single bar; but I prefer to make it of two bars, J J, Fig. 2, bent inwardly and connected at the top by a cross-bar, J', so as to allow hand-holds L to be placed upon the ends of said cross-bar. These hand-holds are in the nature of swiveling-sleeves, as shown in Fig. 7, and are provided with cranks $e$, so that they serve the double purpose of hand-holds and means for actuating the clutches without releasing the hold of the hands when the vehicle is under way. As shown, the hand-holes are connected through a cord with devices for operating the clutches for the wheels, which I will describe more fully hereinafter. Now, by grasping the hand-holds, as indicated by the dotted rider in Fig. 1, it will readily be seen how the power of the hands is applied to turn the crank-axle.

To secure the co-operation of the feet I employ a treadle, M, arranged transversely to the machine, and whose opposite ends are attached to the ends of cords $f$, which pass from the treadle around housed pulleys $g$, carried by rearwardly-projecting arms N, which arms are rigidly connected to the hand-lever bars J and project rearwardly therefrom at right angles. The cords then pass over guide-pulleys $h\ h$, and their ends are attached to the cross-head O upon opposite sides of the guide-wheel spindle, to which said cross-head is rigidly keyed. The treadle as thus geared I make to serve a double purpose: first, when an equal pressure of both feet is applied to this treadle it will be seen that the pressure is applied through the cords to the arms N, so that the pressure of the hands and feet act in unison upon the pitmen K to drive the crank-axle; and, secondly, the treadle being fulcrumed at *i* to a swinging frame, *j*, an excess of pressure on one side or the other of the fulcrum of the treadle causes one or the other of the cords to pull the cross-head around and turn the guide-wheel, thus furnishing a means for guiding the machine by the feet without removing the feet from the treadle or interfering with or discontinuing the action of the feet in helping to drive the machine.

In turning the machine it will be remembered that the inner wheel should have a slower rate of movement than the outer one, and if both wheels be permanently rigid on the crank-axle it will not be possible to turn at all without causing one wheel to slip on the ground, which is extremely disadvantageous. To remedy this I connect the wheels loosely to the journals of the main axle and provide a clutch for each wheel, which permits them to be locked at will rigidly to the axle. Thus, referring to Figs. 5 and 6, I make in the inner face of the hub of the wheel six recesses, more or less.

Upon the axle, in close proximity to the hub, are two rigid lugs, *k k*, Fig. 5, while the clutch P is formed with projections *l l* and recesses *m m*, the former of which, *l l*, enter the recesses of the hub at the same time that the recesses *m m* of the clutch fit over the rigid lugs *k k* of the axle, thus coupling the wheel and axle rigidly together, but allowing the clutch to be loose on the axle when drawn back. For throwing this clutch into engagement with the hub a spiral spring, Q, (see Fig. 2,) is placed behind said clutch; and to withdraw the clutch from the wheel in turning a curve, backing, or discontinuing the driving action, two elbow-levers, R R, are fulcrumed upon a portion of the frame-work, so as to vibrate in horizontal planes, and one arm of each is made to grasp and swivel about the clutches, while the other arms are attached to cords *n n*, that pass around housed pulleys *p p*, and then (see Fig. 1) to the cranks *e* of the hand-holds L of the main driving-lever. For disconnecting either of these clutches, then, it will be seen that it is only necessary for the operator to turn his hand-hold axially without releasing his gripe thereupon.

In carrying out the main features of my invention I may make several modifications. Thus, for instance, so far as the co-operation of the feet with the hands is concerned, it is not necessary that the treadle should be in the shape of a lever, but they may be in the form of distinct stirrups; and, again, so far as the steering by the treadle-levers is concerned, I may use a set of bell-cranks and draw-rods instead of the cord and pulleys.

When the machine is to be adapted to running on ice I propose to screw to the sides of the fellies of the driving-wheels saw-teeth segments S, Fig. 1, which extend around the whole periphery and furnish an engagement with the ice-surfaces, while the front or guide wheel should be mounted upon a skate-runner or guide-shoe.

Another modification of my invention is shown in Figs. 3 and 4, which is designed for greater speed. The only change made here is to put the driving-wheels and axle behind the crank-axle, then provide additional bearing *t t* for the crank-axle and connect these two axles by two multiple gear-wheels, T U, arranged so that one revolution of the crank-axle produces more than one revolution of the drive-wheels. All the other parts of this modified form are precisely the same as those shown in Figs. 1 and 2.

With this form of velocipede it will be seen that among other incidental advantages which it possesses it is as well adapted for ladies' use as for gentlemen. It furthermore affords a very desirable and healthful movement to all the muscles of the body, serving to secure physical development and pleasant exercise, with an economy of time, at the same time that it is used as a means of transportation to or from one's place of business.

In defining the relation of this case to a prior application filed by me April 20, 1880, I would state that the construction of the axle with two eccentric points, and the connection of the hand-lever and foot-treadle with one of said eccentric points of the axle by a common pitman, and the connection of the seat with the other eccentric point are features shown in said prior case, and I do not, therefore, claim them in this.

Having thus described my invention, what I claim as new is—

1. In a velocipede, the combination of a hand-lever, a treadle, and a steering device, the said treadle being connected with the hand-lever and co-operating therewith to drive the machine, and being also connected with the steering devices and adapted to actuate the same without removal of the feet or interfering with their function of driving the machine, substantially as described.

2. The combination, with the loose wheels, the driving-axle, and the clutches, of the swiveling hand-holds on the hand-levers and means for connecting the same to said clutches, substantially as described.

3. The combination, with the cross-head on the steering-wheel frame and the cord *f*, of the transverse lever-treadle M, fulcrumed at its middle upon the frame *j*, as and for the purpose described.

4. The casting *c*, forming a fulcrum-support for the hand-lever and the seat-bars, and combined with the same and the frame-bars C, as shown and described.

5. The seat I, carried upon springs H, the pivoted bars G, sustaining said spring, and the frame F, sustaining the rear end of said bars, combined with each other and adapted to transmit the pressure of the seat to the crank-axle, as described.

6. The combination, with the drive-wheels of a velocipede, of detachable toothed segments adapted to be screwed to the side of the felly so as to project at the periphery, substantially as and for the purpose described.

WILLIAM W. GILES.

Witnesses:
  CHAS. A. PETTIT,
  EDWD. W. BYRN.